United States Patent [19]

Bernicke et al.

[11] Patent Number: 5,686,134
[45] Date of Patent: Nov. 11, 1997

[54] PROCESS AND DEVICE FOR COATING THE INNER SURFACE OF GLASS TUBES

[75] Inventors: Erhard Bernicke; Jurgen Dame; Rainer Munchhausen, all of Berlin, Germany

[73] Assignee: Prolux Maschinenbau GmbH, Berlin, Germany

[21] Appl. No.: 193,084

[22] PCT Filed: Jun. 5, 1992

[86] PCT No.: PCT/DE92/00483

§ 371 Date: Jul. 6, 1994

§ 102(e) Date: Jul. 6, 1994

[87] PCT Pub. No.: WO92/21631

PCT Pub. Date: Dec. 10, 1992

[30] Foreign Application Priority Data

Jun. 6, 1991 [DE] Germany .......................... 41 19 853.0

[51] Int. Cl.⁶ .................... B05D 5/06; B05C 13/00
[52] U.S. Cl. .................... 427/72; 427/67; 427/157; 427/231; 427/232; 427/165; 118/56; 118/500
[58] Field of Search .................... 427/542, 541, 427/157, 231, 232, 165, 169, 67, 72; 118/704, 56, 500

[56] References Cited

U.S. PATENT DOCUMENTS

| | | | |
|---|---|---|---|
| 2,650,884 | 9/1953 | Pakswer et al. | 427/72 |
| 2,828,216 | 3/1958 | Delriew | 427/72 |
| 3,068,114 | 12/1962 | Ranby et al. | 427/72 |
| 3,372,053 | 3/1968 | McCarthy | 117/70 |
| 3,445,266 | 5/1969 | Wittman | 117/70 |
| 4,597,984 | 7/1986 | Jansma | 427/67 |

FOREIGN PATENT DOCUMENTS

| | | |
|---|---|---|
| 0061758 | 3/1982 | European Pat. Off. . |
| 2022948 | 2/1972 | Germany . |
| 277643 | 12/1951 | Switzerland . |
| 2057917 | 4/1981 | United Kingdom . |

OTHER PUBLICATIONS

Peintures–Pigments–Vernis, Bd. 44, Nr. 1, Jan. 1965; Seite 65, 'Examples de Travaux: Paint Technology, 1975, vol. 31, No. 11, p. 55'.

*Primary Examiner*—Shrive Beck
*Assistant Examiner*—Katherine A. Bareford
*Attorney, Agent, or Firm*—Christie, Parker & Hale, LLP

[57] ABSTRACT

A process and device are disclosed for coating with a suspension the inside of meandrous one-tube glass vessels with U-bends. After the introduction of a measured amount of a suspension, the vessel is axially rotated moving horizontally and is tilted, so that the legs of the one-tube glass vessel take a horizontal position between the reversal points of the tilting movement.

17 Claims, 2 Drawing Sheets

PROCESS AND DEVICE FOR COATING THE INNER SURFACE OF GLASS TUBES

FIELD OF THE INVENTION

The invention concerns a inner surface of meandrous one-tube glass vessels with a suspension, and a device for performing the process.

By "meandrous" or "in a meandrous shape" is meant, with respect to the invention, folded into a continuously connected U-shape.

BACKGROUND OF THE INVENTION

Low-pressure discharge lamps, in particular fluorescent lamps, are widely used for electric lighting. In comparison with incandescent lights, these lamps are characterized by greater lighting efficiency and a longer useful life.

The production of light using low-pressure discharge lamps is achieved through the process of a gas discharge in a discharge vessel: electrons, accelerated in an electric field, collide with and energize gas atoms, which after a short time give up this additional energy in the form of ultra-violet rays; these rays then are transformed into visible light, by passing through a luminous substance applied to the inner walls of the discharge vessel.

Processes are known for applying a luminous substance to the inner surfaces of known discharge vessels, made either of rod-shaped or U-shaped glass tubing. The known processes follow the principle of "fill and dry", or "fill, invert and dry" wherein a suspension is introduced into a discharge vessel, as a spray or under pneumatic pressure. This procedure is known as coating of the discharge vessel. When the discharge vessel is subsequently inverted, excess quantities of the suspension can flow back out of the discharge vessel in a natural way. This stage is followed by a drying procedure.

The kind of process just described is sufficient for discharge vessels that have a simple geometric shape.

Fluorescent lamps that, in contrast to the usual rod-shaped kind, are characterized by a bent discharge vessel and are thus of small dimensions, are known as compact lamps.

With the known compact lamps, the discharge vessel is produced by aligning two or more U-shaped tubes, so that two U-shaped tubes are connected to each other via a hollow coupling at one or other of their legs. This type of discharge vessel can not be coated as a whole using the "fill, invert and dry" process. Instead, the individual U-tubes are coated before they are assembled into the discharge vessel. Consequently the hollow connection devices for the U-tubes, that are affixed only after the coating procedure, receive no, or minimal, coating of the luminous substance and is considered unsatisfactory.

One-tube glass vessels in meandrous form are the subject of German Patent Application P 41 19 852.2, "Process and device for producing one-tube glass vessels in meandrous form", as well as German Patent Application P 42 14 542.2 "Multiple-folded one-tube glass vessels and device and process for their manufacture", from the present applicant. These documents describe multiple-folded one-tube glass vessels with at least four straight parts arranged parallel to each other, and connected to each other by U-shaped sections, with their two open tube ends lying beside each other.

Such vessels are particularly well-suited as discharge vessels for compact lamps. They are characterized, in contrast to the known discharge vessels for compact lamps, by the essentially constant thickness of their walls and an essentially continuous constant cross-section, i.e. they have no constrictions and no dead space.

There is no known process for applying a uniform suspension coating to the inner walls of one-tube glass vessels of meandrous shape.

As mentioned previously, it is not practical to apply a uniform and defect-free coating to a meandrous one-tube glass vessel using the "fill, invert and dry" principle. The process of filling or draining the one-tube glass vessel with the suspension would create eddies in the bends or the legs that would cause disruptive air bubbles. Suspensions are difficult to handle because of their chemical and physical properties; they are thus readily inclined to forming blisters and streaks. A uniform coating requires a continuously eddy-free deposit of the suspension.

Furthermore, excess suspension material would not drain uniformly out of the one-tube glass vessel when it is inverted, but would collect unevenly in the bends and legs of the vessel.

The invention addresses the task of developing a process and a device for applying a uniform coating of suspension to the inner surfaces of meandrous one-tube glass vessels.

SUMMARY OF THE INVENTION

According to the invention, a measured dose of suspension is introduced into one of the two open legs of a meandrous one-tube glass vessel and then the vessel is rotated axially and simultaneously subjected to a horizontal and a tilting motion, The legs of the one-tube glass vessel take a horizontal position between the reversal points of the tilting motion. After the motion is completed, the one-tube glass vessel is dried with the open ends downwards.

In contrast to the known process, the process according to the invention provides a uniform coating of a suspension on the interior surface of a meandrous one-tube glass vessels.

As used in this description, a longitudinal axis is defined by the straight portions of the meandrous one-tube glass vessel. An axial rotation of a meandrous one-tube glass vessel, in the meaning of the invention, is a rotation about an axis running parallel to the straight portions of the one-tube glass vessel and in particular through the center of gravity of the one-tube glass vessel.

It is particularly advantageous if, during the drying of the suspension, the meandrous one-tube glass vessel is at rest in a vertical position.

It is also a feature of the invention that, after coating with a suspension, the meandrous one-tube glass vessel enters the drying section with the tube ends downwards. This allows for the drainage of excess suspension material and a uniform drying of the suspension. The suspension also begins to dry in the upwardly lying U-bends of the meandrous one-tube glass vessel.

In a preferred embodiment, the drying of the suspension is achieved using dry warm air or radiant heat.

It is especially advantageous to have the suspension pass through the meandrous one-tube glass vessel several times, preferably two to four times, forwards and backwards, during the coating process.

It is also advantageous if the measured dose of suspension material that is introduced into one of the open legs of the meandrous one-tube glass vessel is an amount sufficient to provide the coating on the interior surface of the vessel.

It is a feature of the invention that the coating is applied to a meandrous one-tube glass vessels with a tubular cross-section greater than 8 mm.

It is of particular advantage to use the process according to the invention for coating the inner surfaces of meandrous one-tube glass vessels that are to be used as discharge vessels for manufacturing compact lamps. In such cases, in particular, a luminous substance is used as the suspension.

A device for performing the process in accordance with the invention comprises a chain conveyor, glass vessel receptacles, rotation devices, a dosing machine and a drying section. According to the invention, each glass vessel receptacle, with built-in cam disks, is fastened to an endless moving chain on a hinge with vertical degrees of freedom, at regular intervals. Before the drying section, rotation devices are arranged that cause the glass vessel receptacles to move in sequentially contrary rotations, with a simultaneous tilting motion.

The rotation devices run parallel to the motion of the chain and lie in the plane defined by the chain. According to the invention, the motion of a glass vessel receptacle, and thus of a glass vessel, is achieved through the action of a coupling of the built-in cam disk with the rotation devices. The speed and direction of rotation of a glass vessel receptacle is determined by the relative speed differential between the chain drive and the rotation devices.

A dosing device, located before the rotation devices, injects suspension material into one of the open legs of the glass vessel. The chain drive and the rotation devices work so that the corresponding glass vessel receptacles with built-in cam disks move in such a way that a uniform coating of the glass vessel with the suspension is achieved. After passing through the rotation devices, the glass vessel receptacle is led downwards over a track, so that the open ends of the glass vessel are pointing downwards. In this position, the vessel receptacle enters the drying section. After passing through the drying section, the glass vessel is removed from the vessel receptacle.

It is particularly advantageous if the glass vessel receptacles are pivoted on a hinge with a ball bearing. The rotation devices are preferably designed as directional control belts.

In a preferred embodiment, the drying section is designed as a warm-air or radiant-heat tunnel.

An advantageous arrangement is to set the relative speed differential between the chain drive and the rotation devices so that a glass vessel receptacle passing over a rotation device rotates several times, e.g. three to five times around its own axis.

The built-in cam disk is preferably in an oval shape, so that the tilting motion of the vessel receptacle describes a sine-wave.

It is advantageous that the built-in cam disks are set in motion by the rotation devices via a friction coupling and to arrange several, e.g. two to four, rotation devices in sequence.

DETAILED DESCRIPTION

Figure 1:
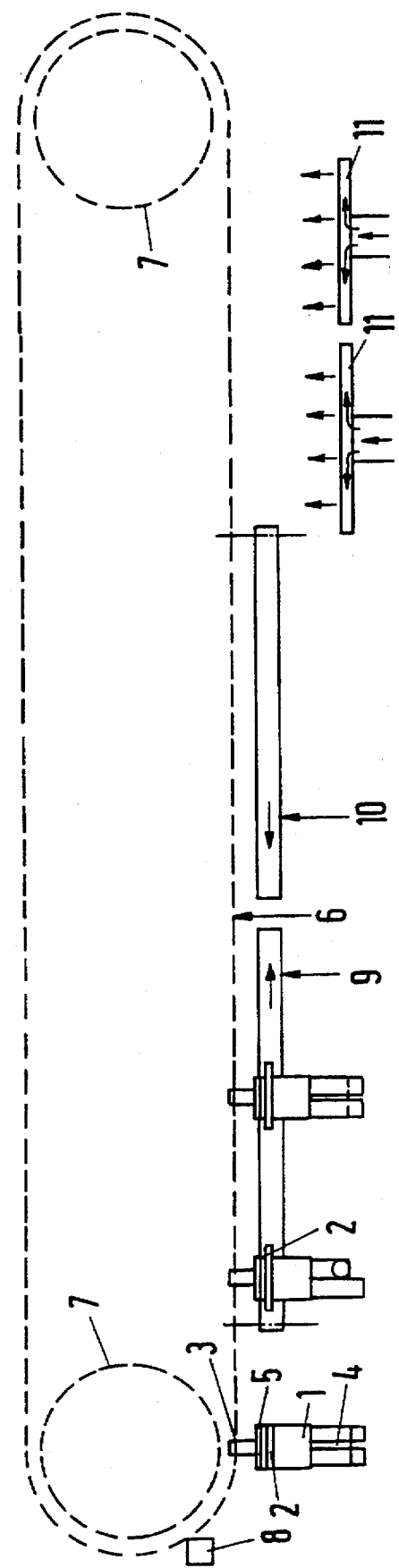
FIG. 1: A diagrammatic presentation of a device for performing the process.

The invention is further explained below, with reference to the figures and diagrams as examples.

A glass vessel receptacle 1 with built-in cam disk 2 is fastened via a vertically mobile hinge 3 on a chain 6, that is driven by sprocket wheels 7. The chain 6 and the sprocket wheels 7 form an endless chain drive assembly. The glass vessel receptacle is pivotally mounted on a ball bearing 5, so that it can rotate about its own axis.

The glass vessel 4 is held by the glass vessel receptacle. A dosing device 8 injects suspension material into one of the open legs of the glass vessel. At this point this leg lies in an upright tilted position.

Following the dosing device, two directional control belts 9 and 10, are arranged in sequence parallel to the chain drive. The turning speed of one of these directional control belts is greater than the speed of the chain drive, while that of the other belt is lesser than the speed of the chain drive, so that two relative speeds in opposite directions are produced.

Figure 2:
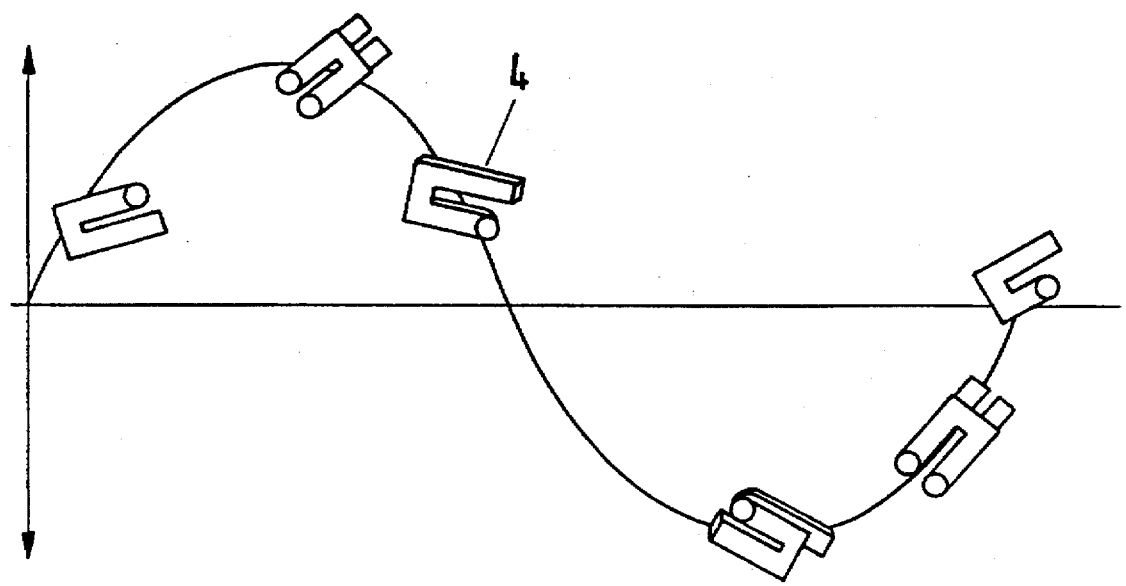
FIG. 2: A diagrammatic presentation of the motion of the meandrous one-tube glass vessel.

The glass vessel receptacle 1 is conducted by the chain 6 to the directional control belt 9. A rotation and a tilting motion of the glass vessel receptacle 1 is produced by the action of a friction coupling of the built-in cam disk 2 with the directional control belt 9. Because of the relative speed differential between the cam disk 2 and the directional control belt 9, the cam disk 2 and thus the glass vessel 4 is set in rotating motion. In addition to the rotational motion, the glass vessel receptacle 2 undergoes a tilting motion, that is determined by the shape of the cam disk 2. In the examples, the built-in cam disk 2 has an oval shape, so that the tilting motion of the cam disk 2 describes a sine wave (FIG. 2).

The relative speed differential between the chain drive 6 and the directional control belts 9 or 10 is set so that the glass vessel receptacle rotates three to five times around its own axis as it passes by the directional control belts. This ensures that the suspension is distributed uniformly over the inner wall of the glass vessel.

By the time the glass vessel receptacle 1, due to the continuous motion of the chain, reaches the end of the directional control belt 9, the remaining suspension material has collected in the open leg, in which no suspension had previously been injected.

The glass vessel receptacle is then conducted on to the directional control belt 10. The coupling of the built-in cam disk 2 with the directional control belt 10 causes the glass vessel receptacle to move in the manner previously described, but the rotation of the glass vessel receptacle 1 occurs in the opposite direction, compared with the motion at directional control belt 9, because of a differing relative speed between the chain 6 and the directional control belt 10.

After passing by the directional control belt 10, the glass vessel receptacle is conducted over a track downwards so that the open ends of the glass vessel point downward. In this position the glass vessel receptacle enters the drying section, which consists of several warm-air stations 11. After leaving the drying section, the glass vessel is removed from the glass vessel receptacle.

What is claimed is:

1. A process for applying a coating of suspension of luminous substance to inner surfaces of a meandrous one-tube glass vessel which includes at least one U-bend, two legs and an open end on each leg and has a longitudinal axis running through the vessel's center of gravity, the process comprising injecting a measured dose of suspension into one of the open ends of the one-tube glass vessel, rotating the vessel about the longitudinal axis with a tilting motion so that the legs of the one-tube glass vessel move into and take a horizontal position between reversal points of the tilting motion, and thereafter drying the one-tube glass vessel.

2. A process according to claim 1 further comprising maintaining the one-tube glass vessel at rest in a vertical position during the drying of the suspension.

3. A process according to claim 1 further comprising initiating drying of the one-tube glass vessel, after coating with a suspension, with the open tube ends downwards so that excess suspension material is drained away and a uniform drying of the suspension occurs.

4. A process according to claim 1 wherein the drying begins at upwardly lying U-bends of the one-tube glass vessel.

5. A process according to claim 1 wherein the vessel is dried with warm air or radiant heat.

6. A process according to claim 1 wherein the suspension is caused to flow through the one-tube glass vessel during the coating procedure at least two times, forwards and backwards.

7. A process according to claim 1 wherein the measured dose of suspension is an amount sufficient to provide a coating on the inner surface of the vessel.

8. A process according to claim 1 wherein the one-tube glass vessel to be coasted has a cross section greater than 8 mm.

9. A process according to claim 1 wherein the step of injecting a measured dose comprises the step of injecting a measured dose of suspension in an open end of a meandrous one-tube glass vessel having four straight legs lying parallel to each other which are connected to each other by U-shaped sections, and two open ends.

10. A device for applying a coating of a suspension of luminous substance to inner surfaces of a meandrous one-tube glass vessel which includes at least one U-bend with open legs comprising injecting a measured dose of suspension into one of the open legs of the one-tube glass vessel, rotating the vessel about its axis with a horizontal and a tilting motion so that the legs of the one-tube glass vessel take a horizontal position between reversal points of the tilting motion, and thereafter drying the one-tube glass vessel with the open tube ends downwards, comprising an endless chain drive, a glass vessel receptacle having a built-in cam disk mounted on an endless chain drive, and drying section rotational devices to rotate the glass vessel receptacles sequentially in opposite directions with a simultaneous tilting motion.

11. A device according to claim 10 wherein the rotational devices comprise directional control belts.

12. A device according to claim 10 wherein the drying section comprises at least one of means to provide warm air or a radiant-heat tunnel.

13. A device according to claim 10 further including means to rotate the glass vessel receptacle at least three times about its own axis.

14. A device according to claim 10 wherein the built-in cam disk is shaped so that the tilting motion of a glass vessel receptacle describes a sine wave.

15. A device according to claim 10 wherein said built-in cam disk is set in motion by the rotation devices via a friction coupling.

16. A device according to claim 10 comprising two to four rotation devices provided before the drying section.

17. A device according to claim 10 wherein the glass vessel receptacle is pivotally mounted on a hinge.

* * * * *

UNITED STATES PATENT AND TRADEMARK OFFICE
CERTIFICATE OF CORRECTION

PATENT NO. : 5,686,134
DATED : November 11, 1997
INVENTOR(S) : Erhard Bernicke; Jurgen Dame; Rainer Munchhausen It is certified that error appears in the above-indentified patent and that said Letters Patent is hereby corrected as shown below:

Column 1, line 6, after "a" and before "inner" insert
 -- process for coating the --.
Column 2, line 36, change "vessels" to -- vessel --.
Column 2, line 66, change "vessels" to -- vessel --.
Cooumn 5, line 22, replace "coasted" with -- coated --.

Signed and Sealed this

Eleventh Day of August 1998

Attest:

BRUCE LEHMAN

Attesting Officer

Commissioner of Patents and Trademarks